United States Patent Office 3,646,175
Patented Feb. 29, 1972

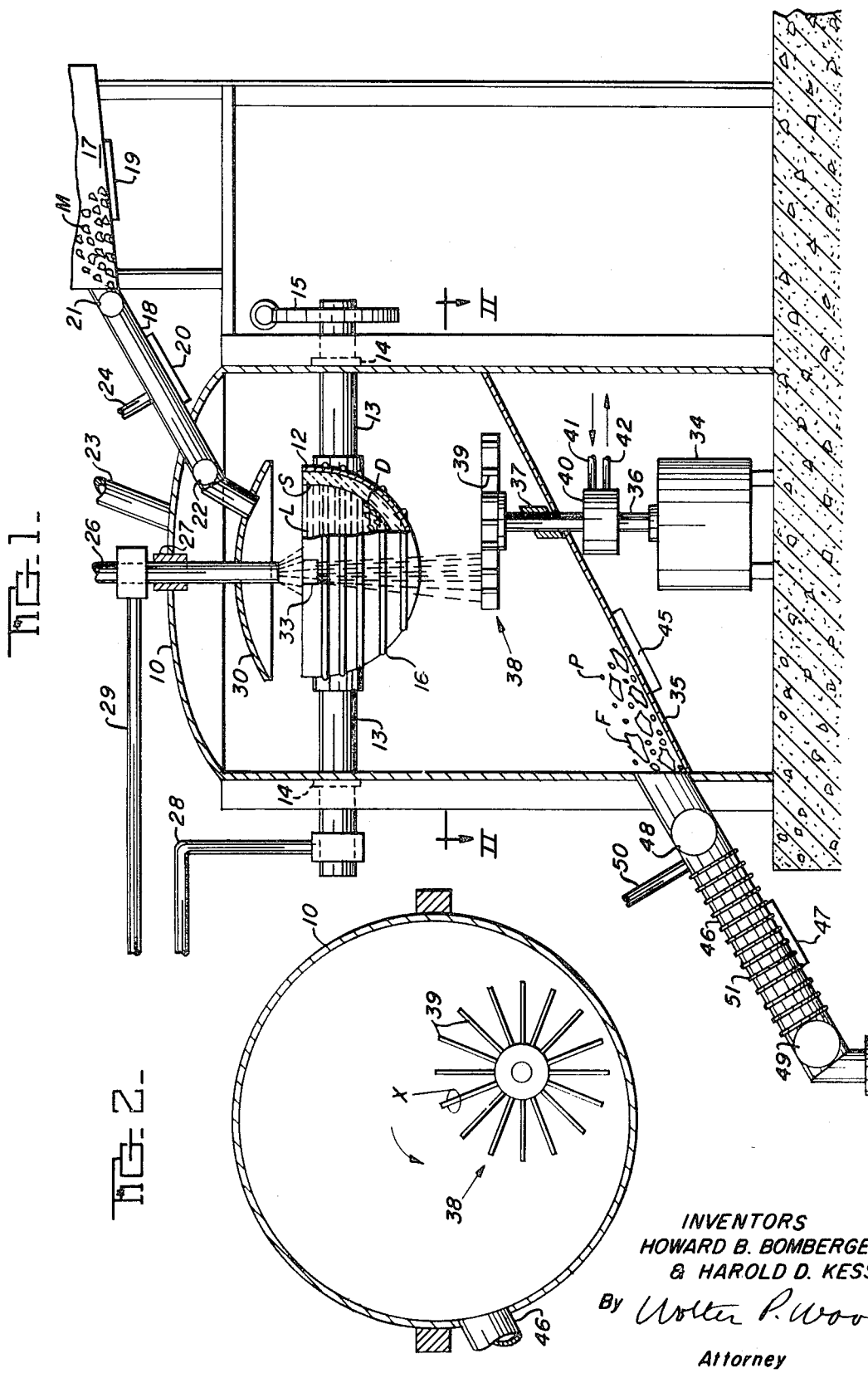

3,646,175
METHOD AND APPARATUS FOR CONVERTING MISCELLANEOUS PIECES OF REACTIVE METALS TO A USABLE FORM
Howard B. Bomberger, Jr., and Harold D. Kessler, Canfield, Ohio, assignors to RMI Company, Niles, Ohio
Continuation of application Ser. No. 726,400, May 3, 1968. This application Sept. 21, 1970, Ser. No. 74,201
Int. Cl. B22f 9/00
U.S. Cl. 264—8
10 Claims

ABSTRACT OF THE DISCLOSURE

Pieces of a reactive metal, such as titanium or zirconium, are melted on a hearth within a chamber which is evacuated or filled with inert gas. Stream of molten metal overflows the hearth and is acted on by a mechanism which disperses it into small particles. The particles solidify as pellets and/or flakes which are readily blended with sponge metal and used in making up a melting charge. Dense inclusions in the starting material sink to the bottom of the hearth and thus are eliminated from the product.

---

This application is a continuation of U.S. application S.N. 726,400, filed on May 3, 1968 and now abandoned.

This invention relates to an improved method for converting miscellaneous pieces of a reactive metal to a form suitable for blending and usable in making up a melting charge.

As used in the present specification and claims, the term "reactive metal" refers to any metal which in its molten state oxidizes immediately on exposure to air. Examples are titanium, zirconium, hafnium, and alloys which have one of these metals as a base. Conventional practice in producing ingots of reactive metals is to make up a melting charge of sponge metal blended with scrap or other small pieces and any alloying ingredients, and melt the charge as an electrode in a consumable-electrode furnace. Any piece which contains a dense inclusion, such as a carbide tool bit or a chunk of molybdenum, tungsten or tantalum, must not go into a melting charge, even though the inclusion may be very small. Such inclusions do not melt, but remain as objectional inclusions in the ingot and in finished parts made therefrom. Small pieces of scrap, such as lathe turnings and sheet clippings, are readily used in a melting charge, provided they contain no harmful inclusions and are of the proper composition to go into the ingot. Larger pieces, such as crop ends, can be welded together to form an electrode. It is difficult to make any use of (1) pieces which contain dense inclusions; (2) pieces of in-between size too large to blend with sponge metal but too small to weld; and (3) fines from a sponge plant. Such materials are disposed of at a fraction of their value as normal sponge metal.

An object of our invention is to provide a method for converting miscellaneous pieces of a reactive metal of any available size or shape or containing dense inclusions to a form and quality suitable for blending and usable in making up a melting charge.

A further object is to provide a converting method which produces reactive metals in the form of small pellets and/or flakes readily blended with sponge metal to form a melting charge.

A more specific object is to provide a converting method in which reactive metal pieces of any available size or shape are melted and the liquid metal dispersed mechanically so that it solidifies as small pellets and/or flakes readily used in a melting charge, while dense inclusions are eliminated.

Another object is to provide a method of utilizing metal pieces contaminated with interstitially soluble oxygen or nitrogen by diluting contaminated portions into a larger mass to achieve the desired composition.

In the drawings:

FIG. 1 is a partly diagrammatic vertical sectional view of an apparatus for performing the method of our invention; and FIG. 2 is a horizontal section on line II—II of FIG. 1 showing a preferred form of dispersing wheel embodied in the apparatus.

Our apparatus is housed in a chamber 10 from which we exclude gases which react with the reactive metal; that is, we may either evacuate the chamber or fill it with an inert gas, such as argon. We mount a water-cooled metal hearth 12, preferably copper, in the upper portion of the chamber on horizontal trunnions 13, which extend through bearings 14 in the opposed side walls of the chamber. We show a mechanism 15 for tilting the hearth connected to one of the trunnions outside the chamber, and a water line 16 wrapped around the hearth to provide cooling. We feed miscellaneous pieces M of reactive metal to the hearth from a bin 17 through an airtight chute 18 which extends through the top wall of the chamber. We equip the bin and chute with vibrating feeders 19 and 20 respectively. The chute has a pair of air locks 21 and 22, only one of which can be open at any one time. The feeders and air locks per se are of conventional construction and hence not shown in detail. We connect pipes 23 and 24 to the chamber and to the chute between the two air locks, through which pipes we evacuate the chamber and chute or introduce inert gas.

The apparatus includes means for melting metal pieces which have been fed to the hearth 12. The melting means illustrated is a non-consumable electrode 26 which extends through a gas seal 27 in the top wall of chamber 10 to the vicinity of material on the hearth. The electrode may be of any suitable material, such as carbon, graphite, tungsten or water-cooled copper. We connect bus bars 28 and 29 to one of the trunnions 13 and to the electrode 26 respectively for applying electric current and producing an arc which melts pieces on the hearth in accordance with known principles. Melted metal solidifies at the hearth wall and forms a skull S which contains a pool L of liquid metal. Dense inclusions D in the feed material do not melt, but sink to the bottom of the pool and thus are eliminated from the product. Preferably we mount a refractory heat shield 30 on the electrode above the hearth to protect the top wall of the chamber. It is also apparent we could employ other melting means, such as an electron beam, a consumable electrode of the same metal as the pieces M, a plasma arc device or a hollow cathode.

The hearth 12 has an overflow 33 from which liquid metal L discharges to a dispersing mechanism below. We may tilt the hearth on its trunnions or merely allow the metal to overflow while the hearth remains upright. We show a dispersing mechanism which includes a drive motor 34 beneath the chamber floor 35, a vertical shaft 36 extending upwardly from the motor through a gas seal 37 in the floor, and a metal wheel 38, preferably copper, fixed to the upper end of the shaft. As FIG. 2 shows, the wheel is formed of a plurality of angularly spaced spokes 39 and is open at its circumference between spokes. Conveniently the vertical dimension of the wheel is about 1 to 15 inches and the diameter about 5 to 60 inches. The wheel spins at speeds of about 100 to 3000 r.p.m. Preferably we water-cool it shaft 36 and wheel 38 to permit continuous operation. We show a water jacket 40 and inlet and discharge lines 41 and 42 for this purpose. Heat from small wheels is removed through the shaft, but larger wheels may have internal cooling ducts. The stream of liquid metal from hearth 12 strikes the wheel intermediate its axis and circumference, as indicated at X in FIG. 2. It is also apparent we could use multiple wheels or dispersing means of other design.

As the stream of liquid metal strikes the wheel, the rapidly moving spokes 39 mechanically disperse it. The resulting dispersed particles quickly solidify in the form of small pellets P, flakes F or a mixture of the two, as illustrated. The chamber floor 35 slopes away from the shaft 36 and may carry another conventional vibrating feeder 45. An airtight exit chute 46 extends from the chamber at the low point of the floor 35 for collecting the product. Wheel 38 rotates in a direction to throw the dispersed particles toward the exit chute, as indicated by the arrow in FIG. 2. We equip the exit chute with another vibrating feeder 47 and a pair of air locks 48 and 49. We connect a pipe 50 to the exit chute between air locks, through which pipe we evacuate the chute or introduce inert gas. Preferably we cool the exit chute with water which flows through a line 51 wrapped around the chute.

When the product is a mixture of pellets and flakes, we prefer to screen the mixture to separate pellets from flakes. The pellets range in diameter from about 0.01 to 0.25 inch, while the flakes are paper thin and readily broken to any desired size. Both the pellets and flakes are readily incorporated in an electrode or other melting charge, but are best used separately. If portions of the feed material are contaminated with interstitially soluble oxygen or nitrogen, the contaminated portions are distributed through the product mass, whereby the contamination is lowered to an acceptable level. Likewise if the product picks up contaminants, such as carbon, in the conversion process, we lower the contamination to an acceptable level by blending the product with virgin metal as we make up the melting charge.

From the foregoing description, it is seen that our invention affords a simple method for converting miscellaneous pieces of a reactive metal to a form usable in making up a melting charge. Heretofore many such pieces have been incapable of use and wasted. Thus our invention effectively overcomes the problem of utilizing valuable material otherwise lost.

While we have shown and described only a single embodiment of our invention, it is apparent that modifications may arise. Therefore, we do not wish to be limited to the disclosure set forth but only by the scope of the appended claims.

We claim:

1. A method of converting pieces of reactive metal to a form usable in making up a melting charge, said pieces being of miscellaneous size and shape and subject to contain dense inclusions which must be eliminated from the melting charge, the metal being one which in its liquid state oxidizes immediately on exposure to air, said method comprising feeding the pieces to a hearth, melting the metal on said hearth, water-cooling said hearth, solidifying on said hearth a portion of the liquid metal to form a skull which contains a pool of liquid metal, any dense inclusions in said metal remaining unmelted and sinking in said pool, overflowing a stream of liquid metal from said pool, dispersing said stream below said hearth, solidifying the resulting dispersed particles in the form of small pellets and flakes from which dense inclusions have been eliminated, and excluding air from the metal from the point where the pieces feed to said hearth until the particles solidify.

2. A method as defined in claim 1 in which the pieces are melted by an electric arc formed between the pieces and a non-consumable electrode.

3. A method as defined in claim 1 in which the stream is dispersed mechanically by striking a rapidly spinning wheel.

4. A method of converting pieces of reactive metal to a form usable in making up a melting charge, said pieces being of miscellaneous size and shape and subject to contain dense inclusions which must be eliminated from the melting charge, the metal being one which in its liquid state oxidizes immediately on exposure to air, said method comprising feeding the pieces to a hearth, melting the metal on said hearth, water-cooling said hearth, solidifying on said hearth some of the metal which has melted and thereby forming a skull which overlies the hearth surface and contains a pool of liquid metal, any dense inclusions in said metal remaining unmelted and sinking in said pool, overflowing and dispersing liquid metal from said pool, solidifying the dispersed metal below the location where it overflows from said pool, the solidified metal being in the form of particles from which dense inclusions have been eliminated, and excluding air from the metal from the point where the pieces feed to said hearth until after the particles solidify.

5. A method as defined in claim 4 in which the solidified particles are in the form of flakes and pellets.

6. A method as defined in claim 4 in which the metal which has overflowed from said pool strikes a rotating member beneath said hearth.

7. A method as defined in claim 6 in which said rotating member is water-cooled.

8. A method as defined in claim 4 in which the pieces are melted by an arc from a non-consumable electrode positioned above said hearth.

9. A method as defined in claim 4 in which the metal is selected from the group which consists of titanium, zirconium, hafnium and alloys which have one of these metal as a base.

10. A method as defined in claim 4 in which said hearth tilts to allow metal to overflow.

No references cited.

ROBERT F. WHITE, Primary Examiner

J. R. HALL, Assistant Examiner

U.S. Cl. X.R.

264—9